United States Patent [19]

Kaneno et al.

[11] 4,373,030
[45] Feb. 8, 1983

[54] POLYCRYSTALLINE TRANSLUCENT ALUMINA SINTERED BODY, A METHOD FOR PRODUCING THE SAME AND A HIGH PRESSURE VAPOR DISCHARGE LAMP OBTAINED BY USING SAID SINTERED BODY

[75] Inventors: Masayuki Kaneno, Tokoname; Takehiro Kajihara, Komaki, both of Japan

[73] Assignee: NGK Insulators, Ltd., Nagoya, Japan

[21] Appl. No.: 260,758

[22] Filed: May 5, 1981

[30] Foreign Application Priority Data

May 15, 1980 [JP] Japan .................................. 55/63312

[51] Int. Cl.$^3$ ...................... H01J 17/16; C04B 35/10; C04B 35/50
[52] U.S. Cl. ................................. 501/152; 220/2.1 R; 313/221; 423/625; 501/153
[58] Field of Search ............................ 106/73.2, 73.4; 501/152, 153; 423/625; 313/221; 220/2.1 R

[56] References Cited

U.S. PATENT DOCUMENTS

| | | | |
|---|---|---|---|
| 4,182,972 | 1/1980 | Kaneno et al. | 106/73.2 |
| 4,214,666 | 7/1980 | Oda et al. | 106/73.4 |
| 4,222,978 | 9/1980 | Oda et al. | 106/73.4 |

*Primary Examiner*—Mark Bell
*Attorney, Agent, or Firm*—Stevens, Davis, Miller & Mosher

[57] ABSTRACT

A polycrystalline translucent alumina sintered body having high in-line transmission, which is suitable for an envelope for a high pressure vapor discharge lamp, is produced by adding to alumina powder having a purity of more than 99.8% MgO or a compound forming MgO in an amount of 0.01–0.1% by weight calculated as MgO, $La_2O_3$ or a compound forming $La_2O_3$ in an amount of 0.001–0.05% by weight calculated as $La_2O_3$, and $Y_2O_3$ or a compound forming $Y_2O_3$ in an amount of 0.001–0.5% by weight calculated as $Y_2O_3$, thoroughly mixing the resulting mixture, shaping the mixture into a desired form and firing the shaped article under vacuum or either atmosphere of hydrogen gas or dissociated ammonia gas under oxygen concentration of $10^{-15}$–$10^{-25}$ atm.

2 Claims, No Drawings

POLYCRYSTALLINE TRANSLUCENT ALUMINA SINTERED BODY, A METHOD FOR PRODUCING THE SAME AND A HIGH PRESSURE VAPOR DISCHARGE LAMP OBTAINED BY USING SAID SINTERED BODY

BACKGROUND OF THE INVENTION

1. Field of the Invention

The present invention relates to a polycrystalline translucent alumina sintered body having an excellent in-line transmission, a method for producing the same and a high pressure vapor discharge lamp obtained by using said alumina sintered body. The polycrystalline translucent alumina has excellent light transmission, heat resistance, corrosion resistance and the like, so that such an alumina sintered body has been broadly used for an envelope of a high pressure vapor discharge lamp, window for high temperature, memory erasing window and the like.

2. Description of the Prior Art

As a method for producing such polycrystalline translucent alumina, it has been known that about 0.1% of MgO is added to fine, high purity alumina powder as an additive to control exaggerated grain growth of alumina crystal grains, whereby a dense polycrystalline translucent alumina sintered body having substantially no pores is produced. However this method has had the defect that firing at a high temperature of higher than 1,800° C. is necessary for obtaining a sintered body having an excellent transmission. A process wherein about 0.05-0.1% of each of $Y_2O_3$ and $La_2O_3$ is added as an additive in addition to MgO has been disclosed but even though the firing temperature is lowered to 1,650°-1,750° C. owing to the function of $Y_2O_3$, $La_2O_3$ and the like, the effects of these additives influencing the grain growth of alumina particles are different. Thus, alumina crystal grains in the obtained sintered body are apt to be grown nonuniformly depending upon the ratio of MgO, $La_2O_3$ and $Y_2O_3$ added and therefore it cannot be avoided to degrade the mechanical strength and thermal shock resistance. Furthermore, since amounts of MgO, $La_2O_3$, $Y_2O_3$, etc., added are larger, different phases are formed in the crystal grain boundary and the in-line transmission is very poor and there have been many defects.

SUMMARY OF THE INVENTION

The present invention has been made for obviating these defects and comprises a polycrystalline translucent alumina sintered body in which each content of MgO, $La_2O_3$ and $Y_2O_3$ is 0.001–0.05% by weight ("%" means "% by weight" hereinafter), a weight ratio of MgO/$La_2O_3+Y_2O_3$ is 0.5-2 and the in-line transmission is more than 40%; a method for producing the same; and a high pressure vapor discharge lamp wherein said alumina sintered body is used as an envelope. In the present invention, since MgO, $La_2O_3$ and $Y_2O_3$ coexist as the additive, the firing can be carried out at a temperature as low as 1,650°–1,850° C. and since each content of the additive is as low as 0.001–0.05% and the additive has the specific ration, the second phase is not substantially formed in alumina grain boundary, so that translucent alumina having particularly excellent transmission, mechanical strength and thermal shock resistance can be obtained.

DESCRIPTION OF THE PREFERRED EMBODIMENTS

The polycrystalline alumina sintered body according to the present invention can be produced by the following steps. To $\gamma$-alumina powder having a purity of more than 99.8% and a grain size of 0.01–0.1 µm are added MgO or a compound forming MgO in an amount of 0.01–0.1% calculated as MgO, $La_2O_3$ or a compound forming $La_2O_3$ in an amount of 0.001–0.05% calculated as $La_2O_3$, and $Y_2O_3$ or a compound forming $Y_2O_3$ in an amount of 0.001–0.05% calculated as $Y_2O_3$ and the resulting mixture is mixed in wet process in a ball mill for more than 10 hours and then taken out from the ball mill and dried and calcined at a temperature of 1,150°–1,250° C. for 3–7 hours in air. As alumina starting material, use may be made of $\alpha$-alumina having a purity of more than 99.8% and a grain size of 0.1–0.5 µm other than $\gamma$-alumina and in this case, the calcining step is not necessary. To the calcined powder is added homogeneously 1–3% of polyvinyl alcohol as a binder and the mixture is molded under hydraulic pressure of 5–30 kg/mm$^2$ into a desired shape. The thus shaped article is maintained at about 700° C. for about one hour in air to burn and remove the binder and then fired under vacuum or either atmosphere of hydrogen gas or dissociated ammonia gas and under an oxygen concentration of $10^{-15}-10^{-25}$ atm. The firing is preferred to be carried out in two steps and the primary firing is carried out by maintaining the temperature at 1,300°–1,500° C. for 2–5 hours or by gradually raising the temperature at a rate of 25° C./hr within the temperature range of 1,300°–1,500° C. and then the secondary firing is carried out by maintaining the temperature at 1,650°–1,850° C. for more than one hour. The thus obtained polycrystalline alumina sintered body contains 0.001–0.05% of MgO, 0.001–0.05% of $La_2O_3$ and 0.001–0.05% of $Y_2O_3$ and has a weight ratio of MgO/$La_2O_3+Y_2O_3$ of 0.5–2, an in-line transmission of more than 40% and an excellent mechanical strength. In particular, the case when each content of $La_2O_3$ and $Y_2O_3$ is 0.001–0.01%, is preferable. When one of MgO, $La_2O_3$ and $Y_2O_3$ in the sintered body is less than 0.001%, it is difficult to uniformly disperse the additive, so that the effect of the additive for uniformly causing the densification and the grain growth are not developed. Furthermore, when even one of MgO, $La_2O_3$ and $Y_2O_3$ present in the sintered body is more than 0.05%, the second phase is formed and the transmission, particularly the in-line transmission, is reduced due to scattering of light and such a case is not preferable.

When the weight ratio of MgO/$La_2O_3+Y_2O_3$ is beyond the range of 0.5-2, as mentioned above the additives having different activity affecting the grain growth of alumina grains are nonuniformly dispersed, so that alumina grains grow nonuniformly and therefore the grain size in the sintered body is apt to become uneven and the mechanical strength and the thermal shock resistance are lower. When the oxygen concentration in the sintering atmosphere is higher than $10^{-15}$ atm., oxygen atoms are caught in pores in the sintered body and their removal is difficult, so that no dense sintered body is obtained and therefore the transmission is reduced. When the oxygen concentration is lower than $10^{-25}$ atm., $Al_2O_3$ is reduced to form lower oxides, such as AlO, etc., and alumina is readily volatilized. Accordingly, the oxygen concentration in the firing atmosphere must be within the range of $10^{-15}-10^{-25}$ atm. The in-line transmission in the present invention means a ratio of intensity of the transmitted light to the incident light when light of a wavelength of 0.6 μm is entered by using a double beam-type spectrophotometer with respect to a sample having a cross-sectional area of 10×10 mm and a thickness of 0.5 mm, which has been obtained by polishing the sintered body.

The in-line transmission and grain size of a polycrystalline translucent alumina sintered body of the present invention and the lamp efficiency when the sintered body is used as an envelope for a 400 W high pressure sodium lamp are shown in the following table. For comparison, the properties of alumina sintered bodies beyond the composition range of the present invention are shown together in the table.

sodium lamps were produced by using this sample, occurrence of cracks was observed in one envelope upon sealing, while in the sample Nos. 1–7 and comparative sample No. 8, no occurrence of cracks was observed.

As seen from the above explanation, the polycrystalline translucent alumina sintered body according to the present invention contains $Y_2O_3$ and $La_2O_3$ as the additive in addition to already used MgO, so that the firing can be carried out at a lower temperature and the content of MgO, $La_2O_3$ and $Y_2O_3$ and the weight ratio of MgO/$La_2O_3+Y_2O_3$ are particularly defined, so that the second phase is not substantially formed in the crystal grain boundary and therefore the in-line transmission is excellent and alumina crystal grain size is uniform, so

TABLE

| Sample No. | | Amount of additives in sintered body (wt %) MgO | $La_2O_3$ | $Y_2O_3$ | Weight ratio MgO/($La_2O_3$ + $Y_2O_3$) | In-line transmission (%) | Grain size (μm) Average grain size | Grain size distribution | Bending strength (kg/mm²) | Lamp efficiency (Lm/W) |
|---|---|---|---|---|---|---|---|---|---|---|
| Present invention | 1 | 0.001 | 0.001 | 0.001 | 0.5 | 63 | 68 | 40–90 | 34 | 129 |
| | 2 | 0.005 | 0.003 | 0.001 | 1.25 | 54 | 50 | 30–80 | 39 | 128 |
| | 3 | 0.005 | 0.002 | 0.005 | 0.71 | 60 | 53 | 25–80 | 38 | 128 |
| | 4 | 0.005 | 0.005 | 0.005 | 0.5 | 67 | 49 | 25–75 | 40 | 130 |
| | 5 | 0.01 | 0.0025 | 0.0025 | 2 | 44 | 47 | 30–70 | 41 | 127 |
| | 6 | 0.01 | 0.005 | 0.005 | 1 | 69 | 43 | 25–60 | 37 | 130 |
| | 7 | 0.01 | 0.01 | 0.01 | 0.5 | 72 | 41 | 30–55 | 40 | 133 |
| Comparative sample | 8 | 0.01 | — | — | — | 31 | 28 | 15–40 | 45 | 120 |
| | 9 | 0.05 | 0.1 | 0.1 | 0.25 | 65 | 80 | 20–130 | 21 | 128 |

The grain size in the above table was determined by measuring the long axial diameter through microscopic observation of the surface of the sintered body. When the cross-section of the sintered body was observed, the crystal grain size on the surface of the sintered body was substantially the same as the crystal grain size in the inner portion. The bending strength was calculated as an average value of ten samples of the four point bending strength measured under the condition of an outer span of 30 mm and an inner span of 10 mm with respect to a sample of 4×3×40 mm.

As seen from the above table, all the samples according to the present invention have an in-line transmission of more than 40%, accordingly the lamp efficiency is excellent and the grain size is relatively uniform, so that the mechanical strength is high. In the comparative sample containing only MgO, the transmission is not satisfied and when this sample is used as an envelope for a lamp, the lamp efficiency is poor (Sample No. 8). In the sample No. 9 wherein $La_2O_3$ and $Y_2O_3$ are contained in an amount of 0.1% respectively and the weight ratio of MgO/$La_2O_3+Y_2O_3$ is 0.25, the grain size is very uneven, so that the mechanical strength is very poor and when 10 pieces of 400 W high pressure that the mechanical strength is high, so that when a polycrystalline alumina sintered body according to the present invention is used as an envelope for a high pressure vapor discharge lamp, such as a high pressure sodium lamp and the like, the lamp efficiency is high and said envelope can endure large thermal shock when sealing the lamp or lighting on and off. Thus, the present invention has high merit and is very commercially useful.

What is claimed is:

1. A polycrystalline translucent alumina sintered body in which the content of MgO is 0.001–0.04% by weight, the content of each of $La_2O_3$ and $Y_2O_3$ is 0.001–0.01% by weight, a weight ratio of MgO/$La_2O_3$+$Y_2O_3$ is 0.5–2, and an in-line transmission is more than 40%.

2. In a high pressure vapor discharge lamp having an envelope, the improvement wherein the envelope comprises polycrystalline translucent alumina in which the content of MgO is 0.001–0.04% by weight, the content of each $La_2O_3$ and $Y_2O_3$ is 0.001–0.01% by weight, a weight ratio of MgO/$La_2O_3$+$Y_2O_3$ is 0.5–2, and an in-line transmission is more than 40%.

* * * * *